United States Patent [19]
Visos et al.

[11] 3,727,836
[45] Apr. 17, 1973

[54] MANIFOLD GAS VALVE

[76] Inventors: Charles D. Visos, 817 Big Bend Woods Drive, Manchester, Mo. 63011; John J. Love, 1324 Graham, St. Louis, Mo. 63139; Carl A. Smith, 766 Peal Drive; Ralph E. Banes, 2323 Rose Garden Drive, both of St. Louis, Mo. 63125

[22] Filed: Oct. 26, 1971

[21] Appl. No.: 192,431

[52] U.S. Cl. ..................236/80, 137/489, 137/492.5
[51] Int. Cl...............................................F16k 31/12
[58] Field of Search...................137/492.5, 488, 489, 137/495; 236/80

[56] References Cited

UNITED STATES PATENTS 3,351,085    11/1967    Allingham............................137/495

*Primary Examiner*—William E. Wayner
*Attorney*—Charles E. Markham

[57] ABSTRACT

A gas valve device in which a biased closed main valve having a diaphragm operator controls the main flow of fuel therethrough from inlet to the main outlet. Inlet pressure is applied to one side of the diaphragm to move the valve open; the other side of the diaphragm is constantly exposed to outlet pressure. A first restricted passageway leads from the inlet to the one side of the diaphragm and has an "on" and "off" control valve therein. A second passageway leading from a point in the first passageway between the control valve and diaphragm to the main outlet has a pressure regulator valve therein a nd bleeds off a portion of the inlet pressure being supplied to the one side of the diaphragm through the first passageway at a regulated rate thereby to regulate the opening movement of the main valve, and a constant restricted bypass around the pressure regulator valve vents the pressure from the one side of the diaphragm to permit closure of the main valve when the on and off control valve closes. The bypass further provides smoother regulation of the bleed off and a measure of safety against leakage of inlet pressure to the one side of the diaphragm when the control valve is closed.

5 Claims, 1 Drawing Figure

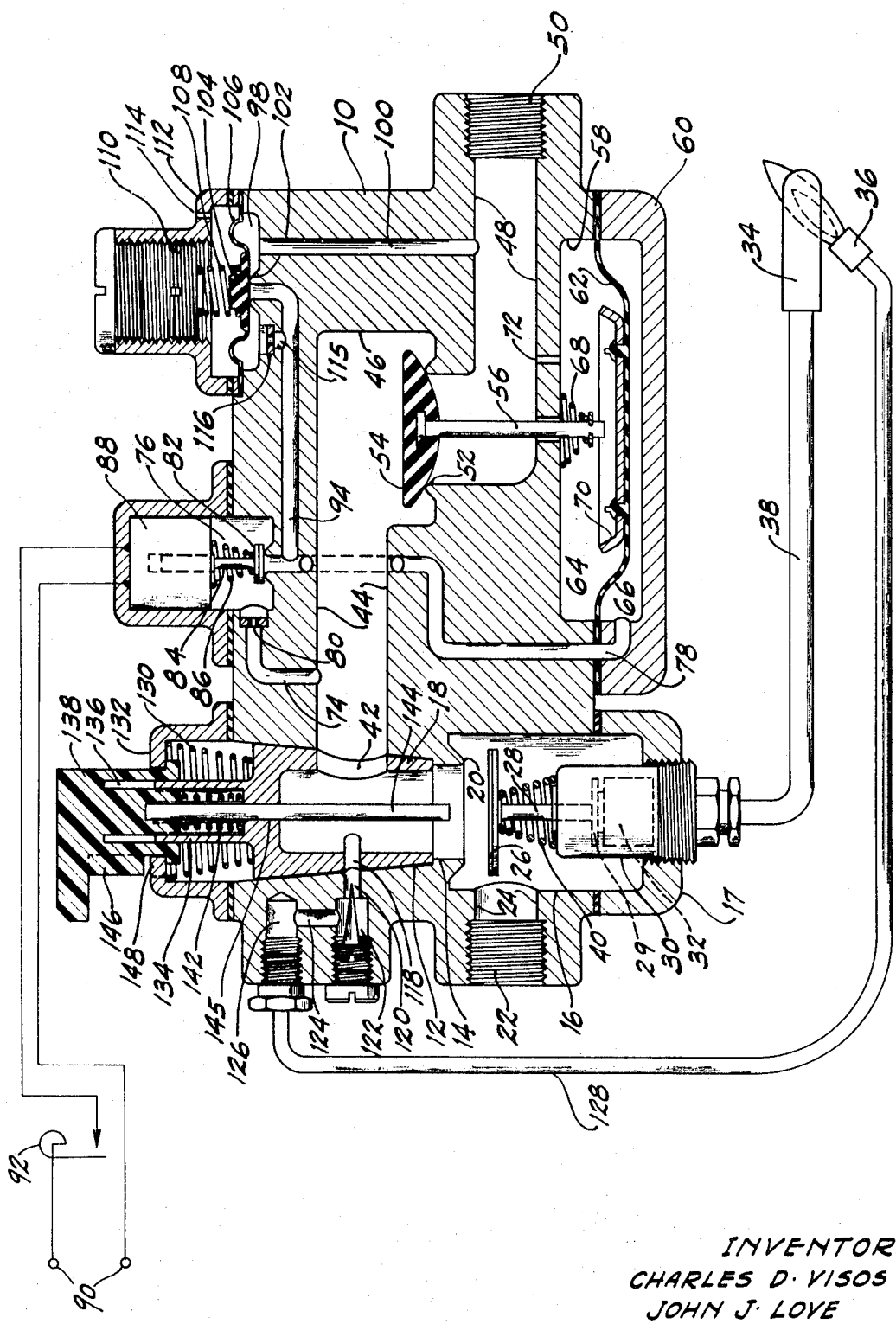

MANIFOLD GAS VALVE

This invention relates generally to gas valves for the safe and automatic operation of gas burners, and particularly to a unitary structure, commonly called a manifold gas valve, embodying a manual cutoff valve, pilot fuel passages, a pilot burner failure cutoff valve, a fluid pressure operated main valve, and pressure regulating means whereby a predetermined rate of flow to a burner is maintained.

Currently, two general arrangements are commonly employed in devices of this kind to control and regulate the application of fluid pressure to the operating diaphragm of the fluid pressure operated main valve so as to maintain a valve open position which will supply gas to a burner at a predetermined constant rate. In the first of these arrangements, illustrated in U.S. Pat. Nos. 3,235,180, 3,300,174, and 3,489,350, one side of the operator diaphragm is constantly exposed to inlet or supply pressure acting in a direction to open the main valve against a closing bias. Inlet pressure is applied to the other side of the diaphragm through a first restricted passageway leading from the inlet to the other side of the diaphragm, thereby to balance the pressure on the one side of the diaphragm and permit the main valve to be closed by its closing bias. When it is desired to open the main valve, this balancing pressure is reduced by bleed off through a bleed passageway leading from the first passageway to the main outlet and including therein an on and off control valve and a pressure regulating valve. Communication between the main inlet and the other side of the diaphragm through the restricted first passageway remains constantly open.

In the second of these arrangements, illustrated in U.S. Pat. No. 3,307,785, one side of the operator diaphragm is constantly exposed to the outlet pressure existing downstream from the main valve. The other side of the diaphragm is also exposed to the same downstream pressure through a first communicating passage controlled by a first on and off control valve when this control valve is open, thereby permitting the main valve to be closed by its closing bias. When it is desired to open the main valve, the first control valve is closed and inlet pressure is applied to the other side of the diaphragm through a communicating passageway under control of a second on and off control valve which is open under these conditions. The application of this inlet pressure is, however, reduced by the provision of a bleed-off passageway connecting the other side of the diaphragm with the main outlet. This bleed-off passageway includes a pressure regulator valve therein, thereby to maintain a constant predetermined open position of the main valve.

It will be noted that in the first-described arrangement any leakage in the bleed-off passage past the control valve when it is closed, or through a ruptured regulator valve diaphragm to atmosphere, or from the diaphragm chamber through a porous body or leaky gasket to atmosphere, will act to bleed off the constant inlet pressure being applied to the other side of the diaphragm to hold the valve closed. Such leakage would, of course, effect opening of the main valve, and inasmuch as the communicating passageway supplying the inlet pressure to the other side of the diaphragm is substantially restricted, only a very small leak would result in some opening movement of the main valve.

In the second-described arrangement any amount of leakage causing a bleed off from the diaphragm chamber would not result in an opening movement of the main valve. However, leakage past the second on and off control valve, when closed, would effect opening of the main valve when the first on and off control valve is closed.

An object of this invention is to provide a generally new and improved manifold gas valve having a fluid pressure operated main valve employing a modified form of the second described arrangement, in which simplification, economy of construction, greater assurance against unsafe operation, and improved regulation of flow are achieved.

A further object is to provide a diaphragm operated valve in which both sides of the operator diaphragm are constantly vented to pressure existing downstream of the valve whereby the valve is biased closed, and in which inlet pressure is introduced to one side of the diaphragm at a greater rate than it is vented, thereby to open the valve against its bias.

Further objects and advantages will appear from the following complete description when read in connection with the accompanying drawing.

The single FIGURE of the drawing is a cross-sectional view of a manifold gas valve illustrating a preferred form of the present invention.

Referring to the drawing, the device comprises a body generally indicated at 10. The body 10 may consist of several sections joined together for convenience of casting or boring cavities and passages therein. In the drawing, however, it is illustrated as an integrally formed structure, with all passages and cavities in the plane of the cross section so as to simplify the description of the invention. The body 10 has a vertical bore therethrough comprising an upper tapered portion 12, an intermediate, reduced diameter, cylindrical portion 14, and a lower, enlarged diameter, cylindrical portion 16. A cover member 17 closes the lower end of the bore.

A tapered, hollow, rotary plug valve 18 is seated in the tapered bore portion and a valve seat 20 is formed at the lower end of the intermediate cylindrical bore portion 14. A horizontal inlet passage 24 leading from a screw threaded inlet 22 intersects the lower bore portion 16 below the valve seat 20 and a safety cutoff valve 26 cooperates with seat 20. The valve 26 has a stem 28 extending downward into a casing 30, which casing is screw threaded into the cover member 17 and extends into lower bore 16. The casing 30 houses an electromagnet 32 including a core and a winding. The electromagnet winding is energized by a thermocouple junction 34 connected to the winding by leads 38. The thermocouple 34 is positioned adjacent a pilot burner 36 and is heated by the pilot burner, whereby the electromagnet 32 is energized.

The valve stem 38 has an armature 29 attached to its lower end and the valve is biased in a closed position on seat 20 by a spring 40. The electromagnet does not have sufficient attractive force to move the valve 26 from its seat 20 to the open position shown. However, when the valve 26 is moved downward manually until the armature 29 bears against the core of electromagnet 32, it will remain in this open attraced position so long as pilot flame exists to sufficiently heat thermocouple junction 34.

The hollow rotary plug valve 18 has a main burner fuel supply port 42 in the wall thereof adapted to register with a horizontal passageway 44 leading to a valve chamber 46. An outlet passageway 48 leads from valve chamber 46 to a screw threaded main burner outlet 50. An annular valve seat 52 is formed in the valve chamber around the outlet passage 48 and a main valve 54 cooperates with seat 52 to control the flow from inlet 22 to main burner outlet 50. Valve 54 has a stem 56 extending downward therefrom through a bore 55 into a chamber having an upper portion 64 formed as a recess 58 in the body 10 and a lower portion 66 formed by a cup-shaped member 60 attached to body 10. A flexible diaphragm 62 clamped at its periphery between body 10 and member 60 divides the chamber into the upper and lower portions 64 and 66. The valve 54 is biased downward in a closed position by a spring 68, and the diaphragm 62 has a relatively rigid, centrally positioned member 70 adapted to engage the valve stem 56 and move valve 54 upward toward an open position when diaphragm 62 flexes upward. The member 70 provides weight biasing the diaphragm in the downward position shown.

The upper chamber portion 64 is vented to outlet passageway 48 through a vent 72. The lower chamber 66 communicates with passageway 44 through a passageway 74, a valve chamber 76, and a passageway 78. A calibrated orifice 80 in passageway 74 limits the rate of flow between passageway 44 and lower chamber portion 66 and a control valve 82 controls the communication therebetween. The valve 82 has a stem 84 and is biased closed by a spring 86. The valve is opened by a solenoid 88 to the plunger of which valve stem 84 is connected. The winding of solenoid 88 is connected across electric power source terminals 90 through a space thermostat 92 so that when the space thermostat closes valve 82 is opened. The control valve 82 is operated, therefore, in an open and closed or on and off manner.

Communication between the lower chamber portion 66 and outlet passage 48 is provided by the passageway 78, a passageway 94, a valve seat 102, a pressure regulator valve chamber 98, and a passageway 100. Valve seat 102 is formed in chamber 98 around the passageway 94, and a pressure regulator valve 104 formed as a part of a flexible diaphragm 106 cooperates with seat 102 to regulate the flow therethrough. The regulator valve 104 is biased closed by a spring 108 acting between the valve 104 and an adjustable nut 110 screw threaded in a cover member 112 attached to the body 10. The periphery of regulator diaphragm 106 is clamped between cover member 112 and the body member 10. The upper side of regulator diaphragm 106 is exposed to atmospheric pressure through a vent 114 in the cover member 112. As pressure in the lower portion 66 of the main diaphragm chamber increases sufficiently above atmospheric the regulator valve is moved openward.

Limited communication between lower portion 66 of the main diaphragm chamber and outlet passage 48 is also provided by a passageway 115 having a calibrated orifice 116 therein. Passageway 115 and orifice 116 bypass the pressure regulator valve 104 and effect the constant limited venting of the lower portion 66 of the main diaphragm chamber to pressure existing downstream from main valve 54. The orifice 116 is sufficiently smaller than orifice 80 in passage 74 to permit the necessary build-up of pressure in chamber 66 to open main valve 54 when control valve 82 is open.

The hollow rotary plug valve 18 is also provided with a circumferentially extending pilot burner fuel supply port 118 in the wall thereof adapted to register with a passageway 120 in the body 10. The passageway 120, a chamber 122, a passageway 124, an outlet passageway 126, and a conduit 128 screw threadedly connected in outlet passage 126 provide communication between the interior of the hollow plug valve and the pilot burner when port 118 is in registry with passageway 120. The pilot port 118 extends sufficiently around the wall of plug valve 18 to permit the registry of passageway 120 therewith when the plug valve is rotated to an on position in which main port 42 and passageway 44 are in registry and also when the plug valve is rotated to a pilot position in which port 42 and passageway 44 are not in registry and fuel flow to the main burner outlet 50 is cut off. A manually adjustable needle valve in chamber 122 provides means for adjusting the flow of fuel to the pilot burner.

The rotary plug valve is urged downward into seating engagement in tapered bore portion 12 by a spring 130 biased between the upper end of the plug valve 18 and a cover member 132 attached to the body 10. The plug valve 18 is provided with a plurality of circularly arranged, integrally formed portions 134 extending upwardly from the upper end thereof. The portions 134 are slidably received in similarly circularly spaced vertically extending slots 136 formed in an operating knob 138, whereby the plug valve 18 rotates with the knob 138 and the knob is free to move axially with respect to the plug valve. The knob 138 extends through an opening in cover member 132 and is slidably movable therein. A spring 142 biases the knob upward and a flange 140 on knob 138 limits its upward movement.

A rod 144 attached to knob 138 and extending axially downward through the plug valve is arranged to engage the cutoff valve 26 when the valve is closed on its seat 20. The rod 144 is slidably guided in a bore 145 in the upper part of the plug valve so that depression of knob 138 will move the valve 26 to an open position with armature 29 in contact with electromagnet 32. The knob 138 is also provided with a fin 146, and the cover member 132 is provided with an accommodating slot 148 which permits manual depression of the knob 138 only when the plug valve 18 is rotated to a pilot position and fin 146 is in registry with slot 148.

OPERATION

The device is shown in an on position in the drawing. That is to say, the hollow plug valve is in a position in which fuel may flow through port 42 to the main burner outlet 50 and through port 118 to the pilot burner 36. Also, the pilot burner is burning and the cutoff valve 26 is held open by electromagnet 32. The thermostat 92 is open, however, so that control valve 82 is closed, thereby cutting off communication between passageway 44 and the lower portion 66 of the main diaphragm chamber. The main valve 54 is therefore biased closed and fuel flow to the main burner is cut off.

Under these conditions, when space thermostat 92 closes due to a drop in space temperature, the control valve 82 is immediately opened and the diaphragm chamber portion 66 is now in communication with inlet 22. As a result, the pressure increases in chamber portion 66 and diaphragm 62 flexes upward, thereby engaging the lower end of valve stem 56 and moving valve 54 openward. Under these conditions the force of pressure regulator spring 108 and the bypass orifice 116 sufficiently restricts bleed off through passages 94 and 100 to permit pressure build-up, which will move valve 54 openward to provide the desired flow of fuel to the main burner which is ignited by the pilot burner. Any increase in gas supply pressure at inlet 22 will cause the pressure to increase in diaphragm chamber portion 66, but this will also cause an increase in pressure in bleed-off passages 94 and 115 so that pressure regulator valve 108 will open further to increase the bleed off and relieve this increase in pressure and thereby adjust the open position of valve 54 so as to maintain the desired fuel flow to the main burner.

When space thermostat 92 opens in response to increasing space temperature resulting from operation of the main burner, the valve 82 immediately closes, cutting off communication between the inlet 22 and diaphragm chamber portion 66. The pressure in chamber portion 66 will now decrease to that existing downstream of valve 54, due to the constant vent provided by orifice 116, whereby valve 54 will be closed by spring 68 and diaphragm 62 will assume its lower position, as shown in the drawing. The provision of the constant calibrated bleed-off orifice 116 obviates the necessity of providing a second control valve in the bleed-off passageway, which closes when control valve 82 opens thereby to permit a pressure build up in chamber portion 66 and which opens when control valve 82 closes to permit venting of chamber portion 66 and closure of the main valve.

It will be seen that any leakage in the bleed-off passageways will not effect a hazardous valve open condition when the thermostatically controlled valve 82 is closed. Also, it will be seen that a substantial leakage past control valve 82, when closed, could occur without effecting a hazardous opening of the main valve due to the constant bleed off through orifice 116. The size of bleed-off orifice 116 is not critical; it is only essential that there is a relationship between the size of input orifice 80 and that of orifice 116 which will result in sufficient pressure in chamber portion 66 for suitable operation of the valve 54. It will be further understood that surges in pressure affecting the pressure regulator, which may be caused by variations in supply pressure or which may result when opening or closing the control valve 82, are damped by the bypass orifice 116, thereby resulting in smoother operation of the pressure regulator.

If, during normal operation, the pilot flame is extinguished for any reason, the electromagnet 32 will become de-energized and the cutoff valve 26 will be closed by spring 40, thereby cutting off the flow of all fuel to the main and pilot burners. Should this occur, it will be necessary to reset the cutoff valve by rotating the plug valve to pilot position and depressing the knob 138 to open valve 26 and holding it depressed while relighting the pilot burner until sufficient energy is developed in the thermocouple junction to hold valve 26 open. The knob 138 may then be released and the plug valve turned to an on position.

We claim:
1. In a gas valve, a body member having an inlet for connection with a source of gas under pressure, a main outlet for connection with a main burner, and a main passageway connecting said inlet and outlet, a biased closed main valve controlling said main passageway, a diaphragm forming the movable wall of an expansible chamber and operative upon expansion of said chamber to move said main valve toward an open position, passageway means providing communication between said inlet and said expansible chamber for increasing the pressure in said chamber, a biased closed thermostatically controlled valve controlling said passageway means, bleed-off passageway means providing communication between said expansible chamber and said outlet, a biased closed pressure regulator valve in said bleed-off passageway means, and constantly open restricted bleed-off passageway means connecting said expansible chamber with said outlet.

2. The gas valve claimed in claim 1, which includes a first orifice in said passageway means providing communication between said inlet and said chamber restricting the flow therethrough and a second smaller diameter orifice in said constantly open bleed-off passageway means.

3. The gas valve claimed in claim 2 in which said first orifice is positioned in said passageway means between said thermostatically controlled valve and said inlet.

4. In a gas valve, a body member having an inlet for connection with a source of gas under pressure, a main outlet for connection with a main burner, and a main passageway connecting said inlet and outlet, a biased closed main valve controlling said main passage, a diaphragm forming the movable wall of an expansible chamber and operative upon expansion of said chamber to move said main valve openward, a smaller passageway leading from a point in said main passageway upstream of said main valve to a point therein downstream from said main valve, a branch of said passageway leading from an intermediate point therealong to said expansible chamber, a thermostatically controlled valve in said passageway between the junction of said branch and its upstream connection with said main passageway, a restricting orifice in said passageway upstream from said thermostatically controlled valve, a biased closed pressure regulator valve in said passageway between the junction of said branch and its downstream connection with said main passageway, a bypass passageway around said pressure regulator valve, and a restricting orifice in said bypass passageway of smaller diameter than said first-mentioned orifice.

5. The gas valve claimed in claim 1 in which an operating regulator diaphragm operatively connected to said regulator valve forms the movable wall of an expansible pressure regulator chamber, in which said pressure regulator chamber forms a part of said bleed-off passageway means, said pressure regulator chamber being in constant communication with said main outlet, communication between said expansible chamber and said pressure regulator chamber being controlled by said regulator valve, and said constantly open restricted bleed-off passageway means comprising a bypass around said regulator valve including said pressure regulator chamber and a restricting orifice between said expansible chamber and said pressure regulator chamber, whereby said regulator diaphragm is constantly exposed to the pressure existing in said expansible chamber through restricted communicating means.

* * * * *